Oct. 27, 1959 N. B. WALES 2,910,335
AUTOMATIC COUNTERBALANCING SYSTEM
Filed Oct. 31, 1957 2 Sheets-Sheet 1
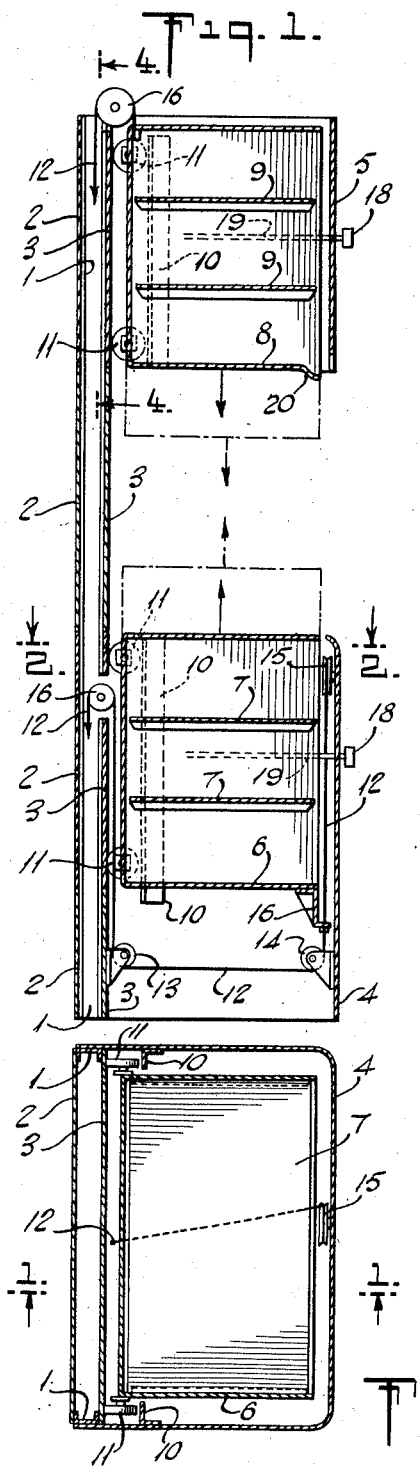
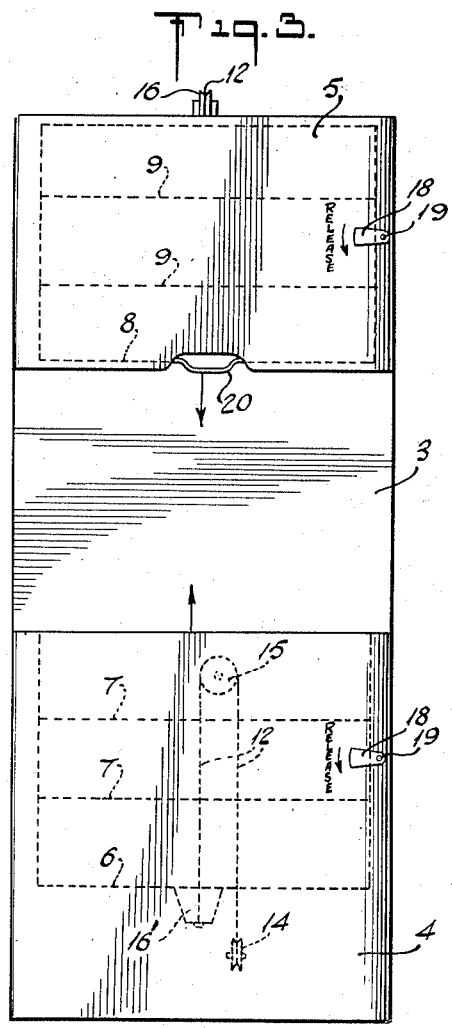
INVENTOR Oct. 27, 1959    N. B. WALES    2,910,335
AUTOMATIC COUNTERBALANCING SYSTEM
Filed Oct. 31, 1957    2 Sheets-Sheet 2
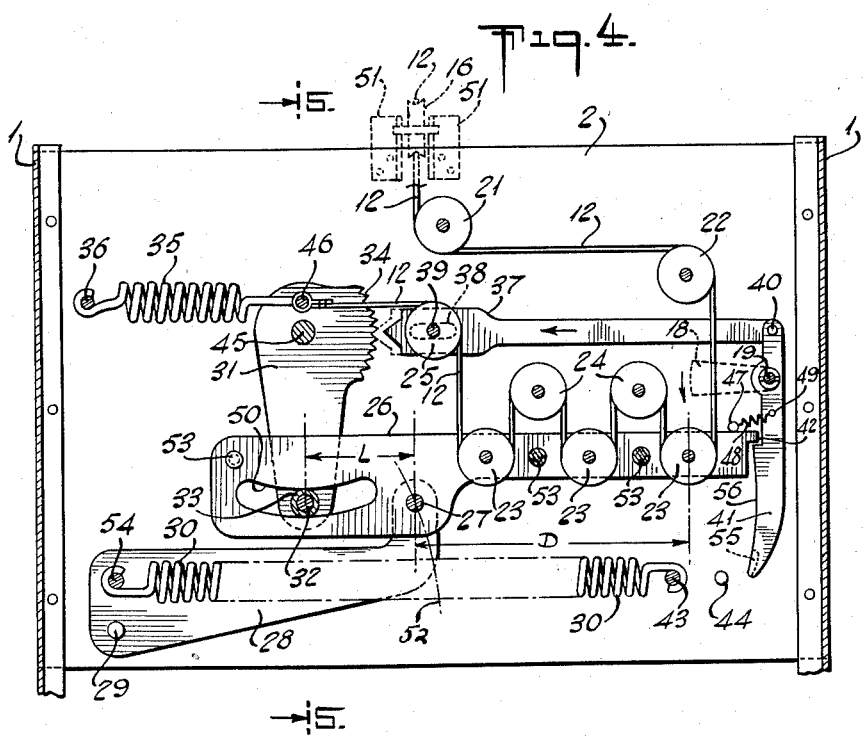
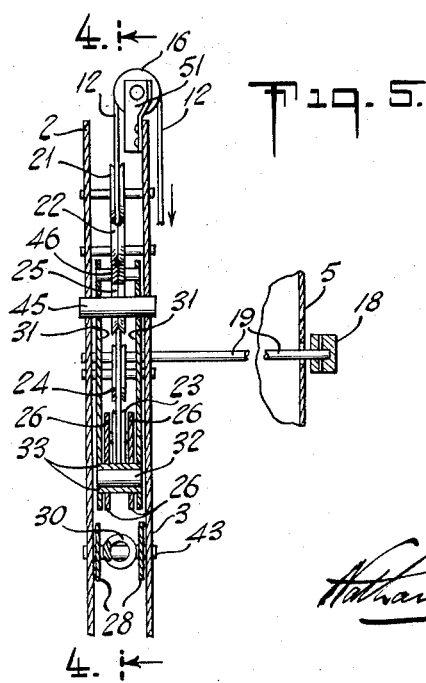
INVENTOR
Nathaniel B. Wales

United States Patent Office 2,910,335
Patented Oct. 27, 1959

2,910,335
AUTOMATIC COUNTERBALANCING SYSTEM
Nathaniel B. Wales, Southampton, N.Y.
Application October 31, 1957, Serial No. 693,696
4 Claims. (Cl. 312—306)

This invention relates to an automatic counterbalancing system for vertically moveable cabinets or platforms whereby widely different weight loads may be automatically compensated against gravity so as to be vertically displaceable with equal effort.

The principle of any counterbalancing system is that means are provided for potential energy to flow between the object counterbalanced and the counterpoise device so as to converse energy.

The subject invention deals with a cabinet or platform having a fixed throw of displacement but having a variable load. Equilibrium is accomplished in my invention by applying a substantially fixed counterbalancing force through a displacement which is varied in proportion to this variable load.

My invention teaches the use of an adjustable motion-multiplying device for coupling the motion of the counterbalancing spring or weight to the motion of the cabinet or platform. The adjustment of the ratio of this multiplication is made, according to my invention, by a mechanical displacement proportional to the weight of the cabinet and its load, so that the greater the weight the less the ratio of motion multiplication, or, conversely, the smaller the weight the greater the ratio of motion multiplication between the motion of the balancing spring or weight and that of the cabinet, both relative to a common supporting frame.

A feature of my invention is that the foregoing adjustment of motion linkage in proportion to the load is made at a fixed loading-unloading position of the cabinet. Means are provided to lock the variable ratio linkage in a fixed ratio at all times except when the cabinet is in the loading-unloading position, at which time the weighing device is unlocked to automatically readjust the linkage ratio in accordance with any load changes which may occur at this station.

In addition, my invention provides a manually accessible latch which automatically locks the cabinet into its loading position on arrival, and simultaneously unlocks the ratio-adjusting-weighing device. This latch must be manually disabled to move the cabinet away from the loading position, thereby relocking the weighing device and ratio control.

(1) An object of my invention is to provide a large-capacity easy-access storage device at low cost.

(2) A second object is to provide an automatic weight-compensating lift-shelf without the use of electric or hydraulic power.

(3) Other objects are implicit in the following specifications and claims.

In the drawings:
Fig. 1 is a side section in elevation of the preferred embodiment of my invention;
Fig. 2 is a plan view through 2—2 of Fig. 1;
Fig. 3 is the front elevation;
Fig. 4 is an enlarged vertical section through 4—4 of Fig. 1; and,
Fig. 5 is the section through 5—5 of Fig. 4.

Referring to the drawings of Figs. 1, 2 and 3, the preferred embodiment comprises a kitchen cabinet having an upper set of cabinet shelves which can be pulled down to the work level, and a lower set of cabinet shelves which can be released to rise up to the same work level. The frame of this cabinet is formed by the two vertical U shaped metal channels 1 to which are secured the several back metal chassis plates 2 and the corresponding front metal chassis plates 3. A lower metal skirt 4 secured to channels 1 forms an enclosure for the lower moveable cabinet 6, which is provided with shelves 7, while an upper metal skirt 5, also secured to channels 1, forms an enclosure for the upper moveable cabinet 8 which in turn is provided with shelves 9. The two cabinets 6 and 8 are each provided with four rubber tired guide wheels 11 which are horizontally journalled thereon. Wheels 11 operate in tracks formed between guide channels 10 secured to the enclosure skirts 4 and 5, and the front chassis plates 3, so as to provide a vertical constraint for the elevation and lowering of cabinets 6 and 8.

Elevator cable 12 is secured to the top of cabinet 6 and thence passes over idler pulley 16 to the automatic counterbalancing device shown in Figs. 4 and 5. Lower cabinet 6 also has an elevator cable 12 secured to it by means of bracket 16 whence cable 12 passes over idler guide pulleys 15, 14, 13, and 16 to a similar automatic counterbalancing device to that used by the upper cabinet 8. The geometry of the cable paths is chosen so that the position of the center of gravity of the cabinets will produce forces reacting with the points of cable support so as to cause the leading guide wheels 11 to be pressed against the front chassis plate 3. In this way no exposed guide track 10 need project downward into the working area.

The upper cabinet 8 is provided with a handle 20 for pulling it down to the loading level where it will latch until released by upper lever 18. The lower cabinet 6, on the other hand, latches in both its down position to which it is manually pushed and, after release to rise by lower latch lever 18, in its raised loading level from which it must be released by lower lever 18 to be pushed down again.

In Figs. 4 and 5 it may be seen that elevator cable 12, which bears the load of cabinet 6 or 8 in tension, enters the mechanism over a pulley 16, which is supported on front chassis plate 3 by brackets 51, see Fig. 4. Thence cable 12 passes over idler guide pulleys 21 and 22, which are pivoted between plates 2 and 3. The cable path then passes in block and tackle manner between the pulleys 23 journalled on lever 26, and the fixed idler pulleys 24 and 25 which are journalled between the chassis plates 2 and 3. After change of direction by pulley 25, cable 12 finally terminates at and is secured to the anchor pin 46 secured to weighing arms 31.

Lever 26 is formed of two flat metal plates secured together by riveted spacer studs 53. Lever 26 is pivotally secured to counterbalance arms 28 by pivot pin 27. Counterbalance arms 28 are in turn pivotally secured to plates 2 and 3 by pivot pin 29. The counterbalance spring 30 is anchored at one end to arms 28 by means of riveted spacing stud 54, and at the other end to plates 2 and 3 by pin 43. Thus, spring 30 exerts a powerful downward force on lever fulcrum 27 as seen in Fig. 4.

Lever 26 is shown in the position corresponding to the presence of its cabinet at the loading level. An arcuate slot 50 in each of lever plates 26 has as its center of curvature the axis of pin 45 which journals weighing levers 31 between plates 2 and 3 when the lever plates 26 are in the position shown. A roller sleeve 33 is journalled on pin 32 which is riveted into weighing arms 31 and this roller is positioned within slots 50. Thus it may be seen that the downward force on counterbalance fulcrum point 27 of lever 26 is opposed by the two upward forces acting on lever 26 due to roller 33 and cable 12. It is also evident that the lever 26 forms a motion multiplyiing device in which the vertical motion of pivot 27 is multiplied by a ratio dependent on the position of roller 33 in slot 50, to generate the large linear vertical displacement of cable 12 as it passes out of the device over pulley 16.

Pin 46, which serves as the terminal anchor for cable 12 also forms an anchor for weighing spring 35 whose other end is anchored to plates 2 and 3 by means of pin 36. Besides being constrained by the position of arms 31 and 28 and by cable 12, the main lever arm 26 is also constrained by stop pin 47 at the "loading level" end of its throw and by pin 44 at the "retracted" end of its cabinet throw.

In addition, lever arm 26 may be latched in the loading level position by means of latch lever 41 acting on latch finger 42 integral with lever 26. Spring 48 acting between stop pin 47 and spring stud 49 secured to latch lever 41 causes latch 41 to be biased in a clockwise direction as seen in Fig. 4 about its pivot shaft 19 which is journalled in plates 2 and 3. Shaft 19 is secured at its inner end to latch lever 41 and at its outer end to lever 18 thereby giving exterior manual access to the operation of latch 41. An extended cam surface 56 integral with lever 41 cooperates with latch finger 42 so that after manual release of the latching action and as long as lever 26 is away from the loading position, lever 41 will be locked in its counterclockwise position. However, lever 41 is linked by pin 40 to the detent arm 37 which is slideably guided by slot 38 in arm 37 to a substantially radial motion with respect to pivot 45, by pivot pin 39. Consequently, the counterclockwise motion of latch 41 about the axis of shaft 19 will cause the detent nose of slide arm 37 to engage the detent teeth 34 integral with weighing arm 31 thereby preventing the weighing arms 31 from rotation about pivot 45 as long as the cabinet is away from its loading position. Since motion of the weighing arm controls the ratio of the counterbalance multiplying lever 26, it also follows that a substantially constant counterbalancing force will be applied to the cabinet and its load as long as the weighing arm 31 is locked.

When cabinet 6 or 8 is moved to the loading position, the cam surface 56 of latch lever 41 passes beyond finger 42 thereby locking lever 26 in the position shown and simultaneously unlocking weighing arm 31. This release allows any change of load in the given cabinet to be reflected in a change in the extension of weighing spring 35 and in a corresponding angulation of arms 31 to a new position of fulcrum roller 33 in slots 50.

It is to be noted that angulation of arms 31 causes no change in the extension of spring 30 when lever 26 is locked in the loading position shown. Thus the weighing arms 31 are free to find a new setting for roller 33, limited only by the friction of the system which is lowered by the use of roller sleever 33.

It is to be noted that the arc 52 along which counterbalance pivot 27 moves has a horizontal component which tends to change the operating ratio of lever 26 in such a way as to compensate for the diminishing force of spring 30 as pivot 27 is lowered by the movement of its cabinet away from the loading position. This results in greater constancy of counterbalancing force.

As noted before, the lower cabinet 6 is arranged to latch at both ends of its travel, whereas upper cabinet 8 need latch only at its lower or loading position. The provision for latching lower cabinet 6 at its down position is shown by the dotted notch 55 on cam surface 56 of latch 41 in Fig. 4. This notch will latch cabinet 6 down when engaged by finger 42, but due to its greater distance from pivot shaft 19, it will not allow detent arm 37 to move sufficiently to unlock weighing arms 31.

The operation of the preferred embodiment of my invention is as follows:

Let it be presumed that the throw of either cabinet 6 or 8 is 24 inches. This will correspond to the motion of the lever arm 26 between the stop pins 44 and 47 due to the linear multiplication of the cable passing between pulleys 23 and 24. Let it further be presumed that the maximum load per cabinet is to be 60 pounds, and that this weight when applied through cable 12 to weighing spring 35 will extend it 1 inch. The design is such that this 1 inch motion of pin 46 (corresponding to the range of variable loads) will move roller 33 through the full arc of slots 50 when permited by detent 37. This, in turn, corresponds to a change in ratio of the multiplying device 26 over approximately a six to one range. This ratio at any given setting is determined by the ratio $D/L$ as seen in Fig. 4 where L is the separation of pins 27 and 32 and D is the effective lever arm of the cable system relative to pivot 27.

Consequently, when cabinet 8 is pulled down by handle 29, and on arrival at the loading position, latch 41 will rotate clockwise thereby releasing the weighing lever 31. If items are now removed from cabinet 8 thereby decreasing the load, spring 35 will contract, thus slightly raising cabinet 8 and moving fulcrum 33 to the right as seen in Fig. 4. This change commits the balance spring 30 to a smaller excursion or energy change when the cabinet is raised into skirt 5, thus compensating for the removed items. Conversely, if weight is added to cabinet 8 in its loading position, spring 35 will extend thereby lowering cabinet 8 slightly and at the same time swinging fulcrum 33 to the left so that more counterbalancing force is available on cable 12 for compensating the added weight.

By adjusting the spring values and lever arms it is possible to bias both cabinets 8 and 9 in the upward position so that the energy stored in forcibly lowering each will be returned when, by release of latches 41, they will automatically ascend.

It is evident to those skilled in the art that various substitutions may be made, such as the use of a weight instead of spring 30, or the use of a pendulum in place of spring 35, without departing from the scope of my invention.

Furthermore, it is evident that the field of use and application of this invention is of a broad scope as for instance, it is most desirable when incorporated in refrigerator cabinets whereby the storage shelf structure can be displaced with a minimum of effort into an easily accessible zone without reaching or stooping for the refrigerator's contents. Also for gas or electric ovens its balanced displacement feature makes it of great sales value for the above stated reasons.

What I claim is:

1. In a counterbalancing device the combination comprising a frame, a platform adapted for vertical movement relative to said frame, a weight responsive member, means to displace said member relative to said frame as a function of the total weight of said platform and any load supported on said platform, a lever, means for applying a substantially constant force between a first point of said lever and said frame, means for transmitting forces between a second point on said lever and said platform, and shifting means responsive to the said displacement of said weight responsive member for moving the fulcrum point of said lever relative to said first and second points on said lever.

2. In a counterbalancing device according to claim 1 means for disabling said shifting means.

3. In a counterbalancing device according to claim 1 means responsive to the vertical position of said platform for disabling said shifting means.

4. In a counterbalancing device according to claim 3 manual means for disabling said disabling means.

References Cited in the file of this patent

UNITED STATES PATENTS

| | | |
|---|---|---|
| 2,082,889 | Hight | June 8, 1937 |
| 2,526,613 | Tanguy | Oct. 17, 1950 |
| 2,592,760 | Sutera | April 15, 1952 |
| 2,759,563 | Narnon | Aug. 21, 1956 |